Sept. 17, 1968   G. H. PARKER   3,402,255
COMPOSITE ELECTRICAL BUS BAR
Filed Dec. 2, 1966
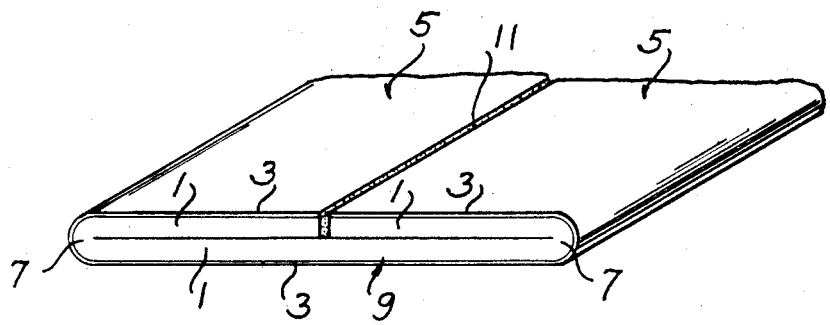
Gregory H. Parker,
Inventor.
Koenig, Senniger, Powers and Leavitt,
Attorneys.

United States Patent Office 3,402,255
Patented Sept. 17, 1968

3,402,255
COMPOSITE ELECTRICAL BUS BAR
Gregory H. Parker, Winnetka, Ill., assignor to Texas Instruments Incorporated, Dallas, Tex., a corporation of Delaware
Filed Dec. 2, 1966, Ser. No. 598,819
7 Claims. (Cl. 174—133)

ABSTRACT OF THE DISCLOSURE

A composite strip of relatively thick aluminum and relatively thin copper metallurgically bonded thereto is marginally folded by bending opposite margins flatwise against one side of the strip so as to place the edges adjacent to one another with the copper outside. The resulting small space between the edges is infilled with a protective material such as solder. The result is a bus bar having an aluminum core faced on both sides and the edges with copper and having rounded longitudinal edges.

---

Among the several objects of the invention may be noted the provision of a low-cost, strong, light-weight and higly conductive bus bar marginally shaped to facilitate application thereto of connectors. Other objects and features will be in part apparent and in part pointed out hereinafter.

The invention accordingly comprises the method and product hereinafter described, the scope of the invention being indicated in the following claims.

The accompanying drawing illustrates one form of the invention.

Corresponding reference characters indicate corresponding parts in the drawing.

Bus bars for carrying substantial currents have heretofore been composed of substantially heavy copper strips of rectangular cross sections having comparatively sharp angular corners. The weight of copper employed made them expensive and the angular corners were not ideal for the reception of the connecting clips. By means of the present invention low-cost, strong, light-weight and highly conductive bus bars are made with marginal shapes facilitating application thereto of such clips.

Referring now more particularly to the drawing, it shows what was originally a flat composite sheet constituted by a comparatively thick layer of aluminum 1 to which has been interfacially bonded on one side a comparatively thin copper layer 3. Such a flat composite may be referred to as single-clad aluminum-copper plate. It is to be understood that copper cladding could be used on both sides of the aluminum (known as double cladding) but this is not preferred. A ratio of thickness of the aluminum 1 to copper 3 may be, for example, nine to one and the total thickness of the plate may be ⅛-inch. For purposes of the invention such flat starting plate is preferably made up in strip form and wide enough to admit of double bending it along its length into the form shown in the drawing. Thus, the strip has opposite portions 5 bent at 7 over an intermediate portion 9 of the original strip, thus placing the copper layer 3 on the outside. The margins at 7, having been turned at 180° by bending, therefore present 180° rounded contours which are favorable to marginal applications of spring-clip circuit connectors. The sum of the widths of the portions 5 is preferably substantially equal to the width of the portion 9 so as to leave as small a space 11 as feasible between portions 5, which space may be infilled with solder or other appropriate protective material, if required. Such material is indicated by the stippling in the drawing. The total thickness of the resulting bus bar made from ⅛-inch composite plate is ¼-inch. It may, for example, be 1½ to 2 inches wide and of any desired length. Since the aluminum of the starting plate material tends to crack easily when bent to any considerable degree while cold, this material should preferably be heated at least in the area being bent. The heating also has an annealing effect so that the portions 5 overlying portion 9 will lie substantially in flatwise engagement therewith and not spring away. The location of the copper cladding layer on the outside of the bus bar is advantageous in making copper connections therewith, without incurring electrolytic effects.

From the above it will be seen that the invention is advantageous in that a single piece of comparatively thin single-clad composite plate may be used as starting material to produce a thick bus bar having the desired smoothly-rounded edges. Of this thickness by far the larger amount is provided by the aluminum, which is highly conductive but less costly than copper and makes the bus bar of lighter weight.

In view of the above, it will be seen that the several objects of the invention are achieved and other advantages results attained.

As various changes could be made in the above method and product without departing from the scope of the invention, it is intended that all matter contained in the above description or shown in the accompanying drawing shall be interpreted as illustrative and not in a limiting sense.

What is claimed is:
1. An electrical bus bar comprising a bonded composite metal strip of an aluminum layer clad with at least one copper layer, marginal portions of said strip being bent and turned at 180° toward one another and against the remainder of the strip to form the bar and to place the copper layer on the outside thereof, the bent margins of the bar being smoothly rounded at said turned portions.

2. A bus bar according to claim 1 wherein the thickness of the aluminum is substantially greater than the total thickness of the copper.

3. An electrical bus bar comprsing a bonded composite metal strip of an aluminum layer which is single-clad with a copper layer, marginal portions of said strip being bent and turned at 180° toward one another and aganst the remainder of the strip to form the bar and to place the copper layer on the outside thereof, the bent margins of the bar being smoothly rounded at said 180° turned portions.

4. A bus bar according to claim 3 wherein the thickness of the aluminum layer substantially exceeds that of the copper layer.

5. A bus bar according to claim 3 wherein the ratio of thickness of the aluminum layer to the thickness of the copper layer is on the order of 9:1.

6. An electrical bus bar comprising a bonded composite strip of an aluminum layer which is single-clad with a copper layer, substantially equal marginal portions of said strip being bent and turned at 180° into substantial edgewise abutment with one another and against the remainder of the strip to cover said remainder to form the bar and to place the copper layer on the outside thereof, the bent margins of the bar being smoothly rounded at said 180° turned portions.

7. A bus bar according to claim 6 including a line of protective material at said abutment.

(References on following page)

References Cited

UNITED STATES PATENTS 1,801,110  4/1931  Ruder _____ 72—700 X
2,752,667  7/1956  Schaefer _____ 29—197

FOREIGN PATENTS 914,139  7/1954  Germany.

LEWIS H. MYERS, *Primary Examiner.*

E. GOLDBERG, *Assistant Examiner.*